UNITED STATES PATENT OFFICE.

SAMUEL KNOPF, OF VIENNA, AUSTRIA-HUNGARY.

PROCESS OF PRODUCING A MINERAL-OIL EMULSION.

941,785. Specification of Letters Patent. Patented Nov. 30, 1909.

No Drawing. Application filed February 6, 1907. Serial No. 356,006.

*To all whom it may concern:*

Be it known that I, SAMUEL KNOPF, a subject of the Emperor of Austria-Hungary, residing at Vienna, Austria-Hungary, have invented certain new and useful Improvements in Processes of Producing a Mineral-Oil Emulsion, of which the following is a full, clear, and exact specification.

The present invention relates to a process for the partial saponification of oleic acid by means of an alkali in the presence of alcohol without the application of heat so that by an addition of mineral oil a mineral oil emulsion is obtained which by being diluted with water can be converted into solid ointment like products.

Heretofore mineral oils have been converted into emulsions by the addition of soaps and similar emulsions have also been produced by the introduction of fats or fatty acids into mineral oil and subsequent saponification by means of alkalies. In all these latter processes, the endeavor is, at times under an addition of alcohol, to effect as complete as possible a saponification, at a high temperature and in certain cases with pressure and a passing through of oxygen. The addition of alcohol is mostly intended merely to dilute the final product.

With the process forming the object of the present invention only a partial saponification of the oleic acid in the presence of alcohol and without the application of heat is effected. With this mixture of partially saponified oleic acid and alcohol, very large quantities of mineral oil can be reduced to an emulsion, which differs essentially from all emulsions produced heretofore as by dilution with water a solid and highly absorbent ointment base is obtained from the liquid and transparent mineral oil emulsion.

The mineral oil emulsion is produced by mixing about 40 parts of oleic acid with about 20 parts of alcohol and 8 parts of potash lye (1:1) there being no necessity to preserve a particular temperature; the mixture can be effected equally well by cold process. 150 parts to 300 parts of mineral oil from any source are then added to 100 parts of the mixture of oleic acid, alcohol and alkali. By the simple addition of 50% of water to the emulsion thus produced, a satisfactory absorbent material is obtained.

The ointment bases now on the market are either very expensive or have the disadvantage that they are not readily absorbed by the skin, or do not readily combine with various medicaments or change their properties by coming in contact with them.

The ointment base produced by the process forming the object of the present invention is a product which is as far as possible neutral and indifferent and which is remarkably cheap and absorbent and at the same time can be used for many purposes for which the emulsions now on the market could not be employed.

Having thus described my invention what I claim is:

Process for producing a mineral oil emulsion consisting in the mixing of 40 parts of oleic acid with about 20 parts of alcohol and 8 parts of 50% potash lye and then adding to the mixture 100 parts to 200 parts of mineral oil and then adding to this mixture 50% of water for the purpose of obtaining a solid ointment like product, substantially as described.

In witness whereof, I have hereunto signed my name in the presence of two subscribing witnesses.

SAMUEL KNOPF.

Witnesses:
ALVESTO S. HOGUE,
AUGUST FUGGER.